(12) United States Patent
Spruit et al.

(10) Patent No.: US 7,426,160 B2
(45) Date of Patent: Sep. 16, 2008

(54) DEVICE FOR DETECTING POSITION INFORMATION FROM AN OPTICAL RECORD CARRIER

(75) Inventors: Johannes Hendrikus Maria Spruit, Eindhoven (NL); Johannes Josephus Leonardus Maria Van Vlerken, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 525 days.

(21) Appl. No.: 11/023,025

(22) Filed: Dec. 23, 2004

(65) Prior Publication Data

US 2005/0105426 A1    May 19, 2005

Related U.S. Application Data

(63) Continuation of application No. 09/571,458, filed on May 16, 2000, now Pat. No. 6,853,615.

(30) Foreign Application Priority Data

Jun. 29, 1999    (EP)    ................................... 99202098

(51) Int. Cl.
*G11B 5/09* (2006.01)

(52) U.S. Cl. ................. 369/47.22; 369/59.19

(58) Field of Classification Search ............. 369/47.27, 369/59.19, 47.25, 47.22; *G11B 5/09, 20/10*
See application file for complete search history.

(56) References Cited

U.S. PATENT DOCUMENTS

| | | | |
|---|---|---|---|
| 4,999,825 A | 3/1991 | Raaymakers et al. ..... 369/44.26 |
| 5,119,359 A | 6/1992 | Miyagi et al. .......... 369/112.05 |
| 5,185,732 A * | 2/1993 | Ogawa et al. ............... 369/47.1 |
| 5,207,998 A * | 5/1993 | Robinson et al. .............. 424/59 |
| 5,506,824 A * | 4/1996 | Fairchild et al. ......... 369/47.22 |
| 5,835,468 A * | 11/1998 | Kabayashi et al. ....... 369/47.54 |
| 6,075,761 A * | 6/2000 | Akiyama et al. ........... 369/47.4 |
| 6,081,490 A | 6/2000 | Kuroda et al. ............ 369/47.28 |
| 6,118,756 A * | 9/2000 | Masuhara et al. ........ 369/275.4 |
| 6,160,776 A * | 12/2000 | Seo ........................... 369/47.1 |
| 6,181,658 B1 * | 1/2001 | Van Den Enden et al. ....................... 369/59.25 |
| 6,233,219 B1 * | 5/2001 | Hori et al. ................ 369/275.4 |
| 6,269,071 B1 * | 7/2001 | Van Den Enden et al. ....................... 369/275.4 |
| 6,292,458 B1 | 9/2001 | Eguchi et al. ............ 369/275.3 |
| 6,400,653 B1 * | 6/2002 | Torazawa et al. ......... 369/13.02 |
| 6,438,082 B2 * | 8/2002 | Asano ..................... 369/47.28 |
| 6,487,149 B1 * | 11/2002 | Yokoi et al. ............. 369/47.25 |
| 6,714,508 B1 * | 3/2004 | Spruit et al. ............. 369/275.4 |

FOREIGN PATENT DOCUMENTS

| | | |
|---|---|---|
| EP | 0786767 A2 | 7/1997 |
| EP | 0930611 A1 | 7/1999 |
| WO | WO9813823 | 4/1998 |

\* cited by examiner

*Primary Examiner*—Aristotelis M Psitos
(74) *Attorney, Agent, or Firm*—Michael E. Belk

(57) ABSTRACT

An optical record carrier (1) is provided with tracks having a groove (4) wobbled in a transverse direction and predetermined positions (18) along the track. The wobble comprises a substantially monotonous undulation (15). Local excursions (16) of the groove superposed on the undulation at the predetermined positions represent position information, such as addresses. The spatial frequency of the undulation is lower than that of the excursions.

18 Claims, 3 Drawing Sheets

Figure 3:
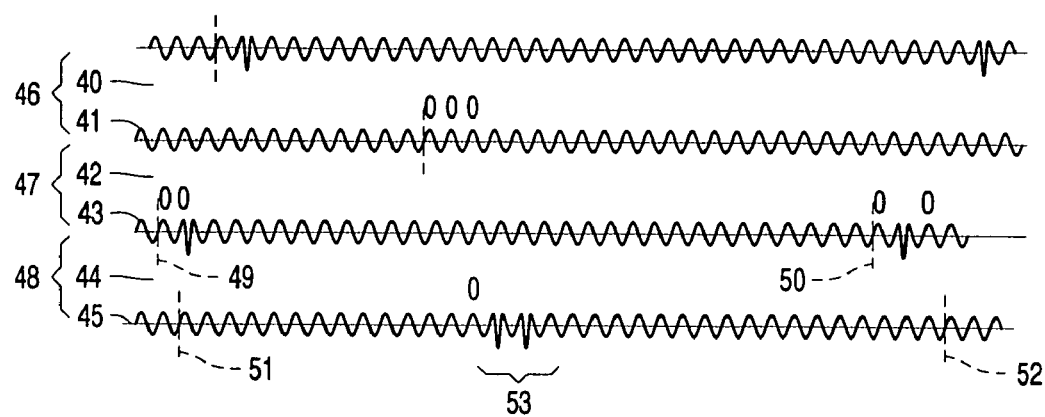

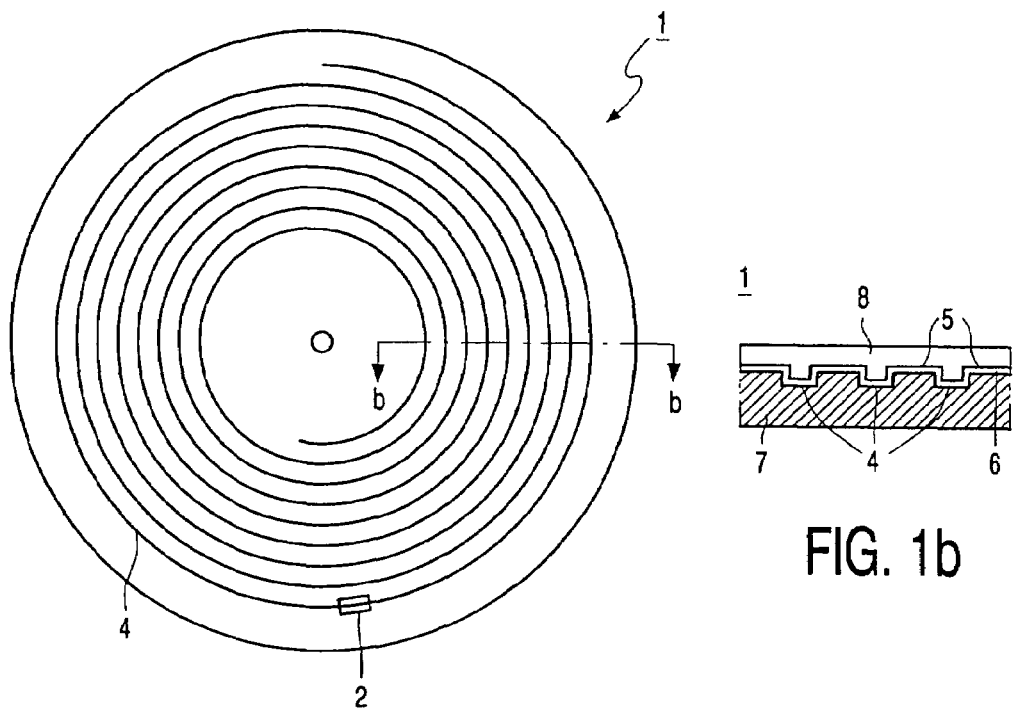
FIG. 1b
FIG. 1a
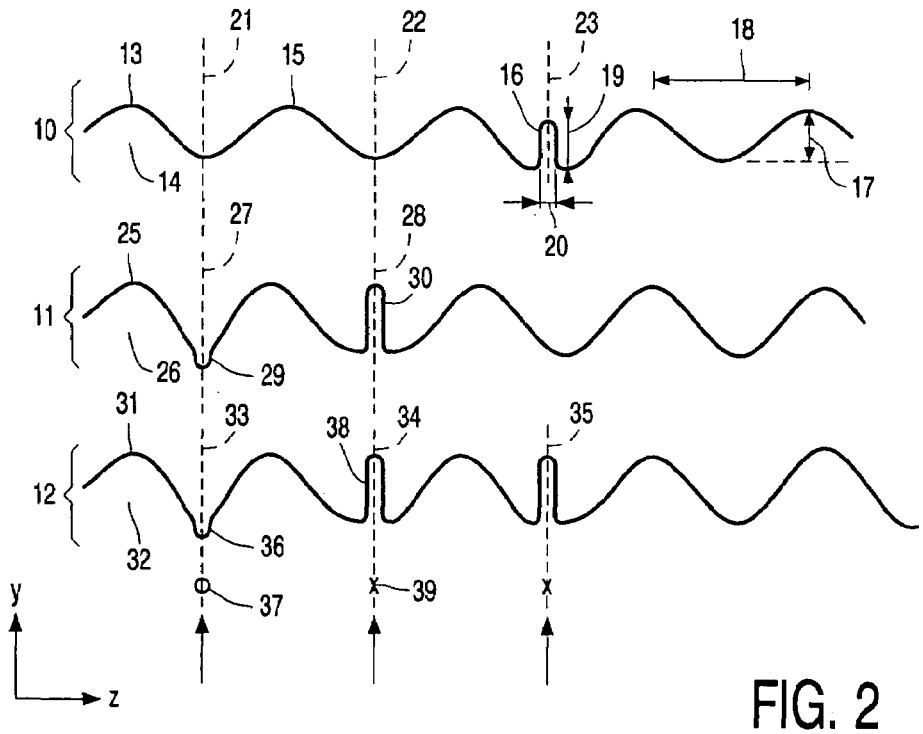
FIG. 2

DEVICE FOR DETECTING POSITION INFORMATION FROM AN OPTICAL RECORD CARRIER

CROSS REFERENCE TO RELATED APPLICATION

This is a continuation of prior application Ser. No. 09/571,458 filed May 16, 2000, that has matured into U.S. Pat. No. 6,853,615.

The invention relates to an optical record carrier comprising a recording layer having substantially parallel tracks for recording user information in a pattern of optically detectable marks, the tracks being provided with grooves in which position information is stored. The invention also relates to an apparatus and a method for scanning such a record carrier.

When writing user information on a record carrier by means of a scanning radiation spot, it is in general desirable to know the position of the radiation spot on the record carrier. A manufacturer of record carriers may provide position information on a virgin recordable record carrier to determine the position from. The position information may be stored in an embossed undulating or wobbled groove or in embossed pits in the record carrier.

The recorded information on the record carrier is arranged in tracks. In general, a track is a line on the record carrier to be followed by a scanning device and which has a length of the order of a characteristic dimension of the record carrier. A track on a rectangular record carrier has a length substantially equal to the length or width of the record carrier. A track on a disc-shaped record carrier is a 360° turn of a continuous spiral line or a circular line on the disc.

A track may comprise a groove and/or a land portion between grooves. A groove is a trench-like feature in the recording layer, separated from neighbouring grooves by land portions of the recording layer, the bottom of the trench being nearer to or further away from the side of the record carrier on which the radiation impinges for scanning it. User information may be recorded on the lands and/or in the grooves in the form of optically detectable areas in the recording layer, e.g. as areas having a characteristic reflection or magnetization. The pits may be located on the lands or in the grooves.

A record carrier according to the preamble is known from U.S. Pat. No. 4,999,825, which discloses an optical record carrier having a groove. The radial position of the centre of the groove is sinusoidally undulated. Position information of the record carrier is stored in a frequency modulation of the undulated. A disadvantage of this known record carrier is that the reliability of the detection of the position information reduces when the density of the tracks is increased.

It is an object of the invention to provide a record carrier in which the position information is stored in the groove in such a way that a reliable detection is possible at higher track densities.

In accordance with the invention, the record carrier as described in the opening paragraph is characterised in that the groove comprises a substantially monotonous undulation at a first spatial frequency and local excursions at a second, higher, spatial frequency superposed on the undulation, the local excursions representing the position information. The decreasing reliability of the detection of the position information stored in the known record carrier at increasing track densities turns out to be caused by a decreasing quality of the clock signal obtained from the groove. The clock signal is used to extract the position information from the signal generated by using the read signal from the groove. The quality of the clock signal from the record carrier according to the invention is improved, because the groove undulation comprises a monotonous undulation and local excursions. An undulation is monotonous if it is of an unvarying repetition. The monotonous characteristic allows a better filtering of the read signal and, consequently, a better generation of the clock signal. The undulation of the groove may be a monotonous sinusoidal deviation of the centre of the groove in the radial direction from its average position. The position information is stored in local excursions of the groove superposed on the monotonous undulation, where 'local' means having a length in the track direction shorter than the period of the monotonous undulation, and preferably about one tenth of the length of the period. A local excursion is a local modification of the groove from the monotonous undulation. Since the excursions are at a higher frequency than the undulation, they can easily be filtered out for the purpose of generating the clock signal and will, therefore, hardly affect the clock signal. It has been shown that the detection margin of the position information remains sufficient on a record carrier where user information is recorded in addition to the position information the undulation deviation and excursion relate to a geometrical parameter of the groove, such as the width, position of the centre live or the depth.

The position information is preferably coded digitally, such that a first local excursion of the groove in a first direction represents a first logical value and a second local excursion in the opposite direction a second logical value. The opposite directions of the excursions increases the detection margin for the discrimination of the position information. The directions are preferably transverse to the track direction, e.g. in the radial direction on a disc-shaped record carrier.

The local excursions of the groove are preferably located at predetermined positions along the tracks, allowing the establishing of a relation between the positions and the clock signal. As an example, the predetermined positions may be located at the same position of each period of the undulation. The clock signal may be use to control a sampling gate for extracting the signal amplitude at the position of the local excursions.

The undulation has preferably an extreme value at a predetermined position. Since the undulation preferably show changes of the deviation around an average value that are smaller than the deviation of the local excursions superposed on the undulation, the undulation will have only a small influence on the shape of the local excursion, thereby facilitating the detection of the excursions. If a local excursion is positioned at an extremum of the undulation, it has preferably a deviation in a direction opposite to that of the undulation. The read signal from the groove will show a large difference in amplitude for an extremum of the undulation with or without an excursion, thereby increasing the detection margin. These two configurations of the groove deviation may be used to represent different logical states. The detection margin can be further increased, if one extremum of the undulation shows an excursion having a deviation in the direction opposite to that of the extremum and another extremum shows an excursion having a deviation in the same direction as the extremum.

The reading of the position information on the record carrier may be made more versatile by storing the position information both in the groove deviation and in embossed pits on lands between neighbouring grooves. The pits may be located at the predetermined positions. The local excursion at a predetermined position with a pit has preferably a deviation towards the pit. The local excursion at a predetermined position without pit has preferably a deviation in the opposite direction. As a result, all predetermined position with pit are accompanied by a first local excursion and those without pit by a second local excursion. The presence of the pit increases the detection margin of the two types of local excursions and, therefore, enhances the signal derived from the local excursions. Conversely, the signal derived from the pit is enhanced by the presence of the local excursion.

The predetermined positions are preferably arranged such that both the undulation and the local excursion at a predetermined position with pit have a deviation towards the pit. In that case the undulation, excursion and pit all combine to enhance the signal derived from the groove or the pits. The increased detection margin allows a reduction of the size of the pits, thereby reducing crosstalk from the pits on the signal representing user information recorded in the tracks. The increased margin also allows proper detection of the position information on a record carrier on which user information has been recorded.

In a special embodiment of the record carrier according to the invention, the predetermined positions are grouped in series alternating with predetermined positions without position information. When the predetermined positions are arranged in cells, the first predetermined position is preferably provided with a local excursion, to be used for synchronisation purposes, identifying the start of the cell. If several cells are grouped in sectors, the first cell of a sector has preferably a unique pattern of excursions, e.g. a first local excursion at each of the first two positions of the first cell, for synchronisation on the sector. The extent of a cell may be a linear extent, measured along a track and useful for a record carrier of the constant linear velocity (CLV) type, or it may be an angular extent, measured over an angular displacement of a circular system of tracks and useful for a record carrier of the constant angular velocity (CAV) type.

The detection margin of the position information may be increased by coding one logical value in two subsequent predetermined positions along a track. A doublet may comprise one first excursion and one second excursion.

In a record carrier wherein land portions are arranged between neighbouring grooves, the phase of the undulation of only one of two neighbouring grooves may be adapted to the presence of a pit. This arrangement is very suitable for record carriers of the CLV type in which no fixed phase relation can be retained between neighbouring grooves undulations.

Alternatively, the phase of the undulation of both neighbouring grooves may be adapted to the presence of a pit on the land between the two grooves, which is very suitable for record carriers of the CAV type. The undulations are preferably in anti-phase to enhance the detection margin. The land portions are preferably alternatingly provided with pits and without pits. When scanning a groove, there are pits on only one side of the groove, thereby reducing cross talk in the read signal between neighbouring tracks.

A further aspect of the invention relates to an apparatus for scanning an optical record carrier having substantially parallel tracks for recording user information in a pattern of optically detectable marks, the tracks being provided with grooves in which position information is stored, the apparatus comprising an optical system for scanning tracks by a radiation beam, a detector for detecting a radiation beam coming from the record carrier, and a signal processor for deriving position information from an output signal of the detector, characterized in that the signal processor is provided with a first filter for passing signal components at a first frequency and forming a clock signal therefrom and a second filter for passing signal components at a second, higher, frequency and forming a signal representing the position information therefrom.

A further aspect of the invention relates to a method of scanning an optical record carrier having substantially parallel tracks for recording user information in a pattern of optically detectable marks, the tracks being provided with grooves in which position information is stored, in which radiation from the record carrier is converted into an electric signal representing track deviations, characterized in that the signal is filtered to pass signal components at a first frequency and converted to a clock signal and in that the signal is filtered to pass signal components at a second, higher, frequency and converted to a signal representing the position information.

Figure 4:
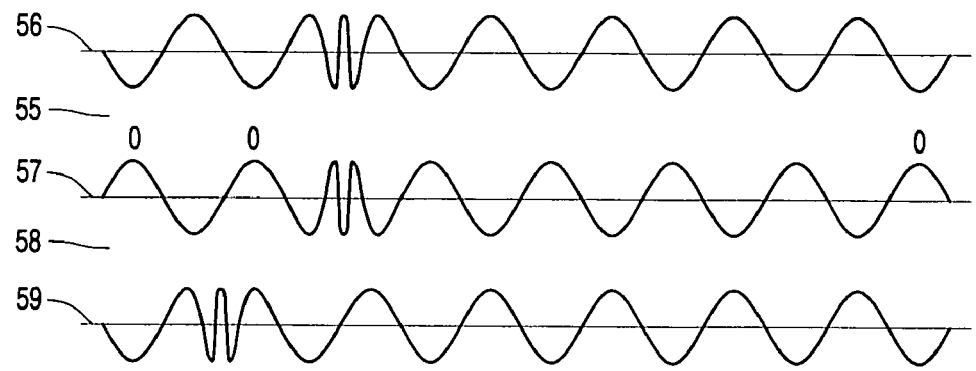
Figure 5:
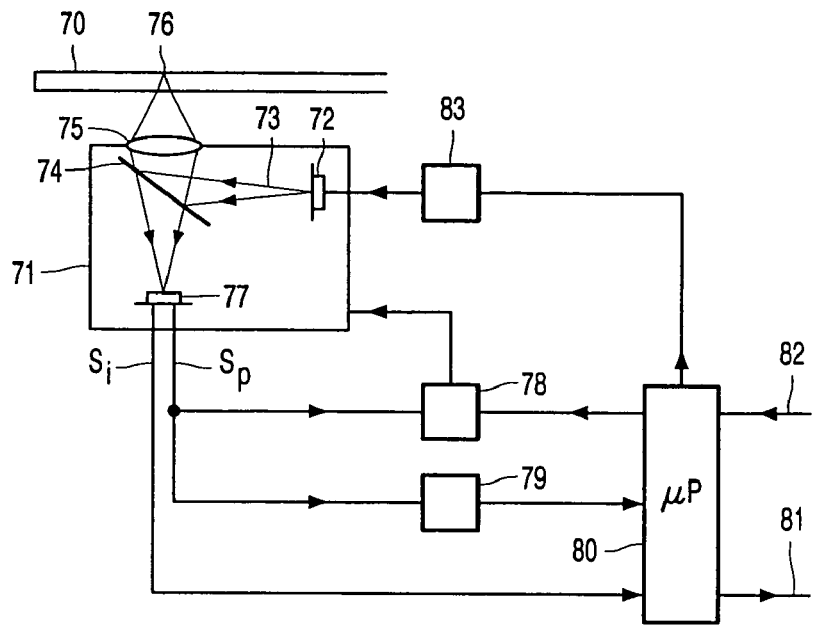
Figure 6:
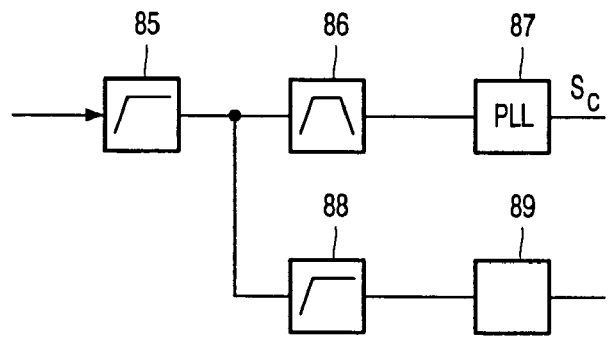
Figure 7:
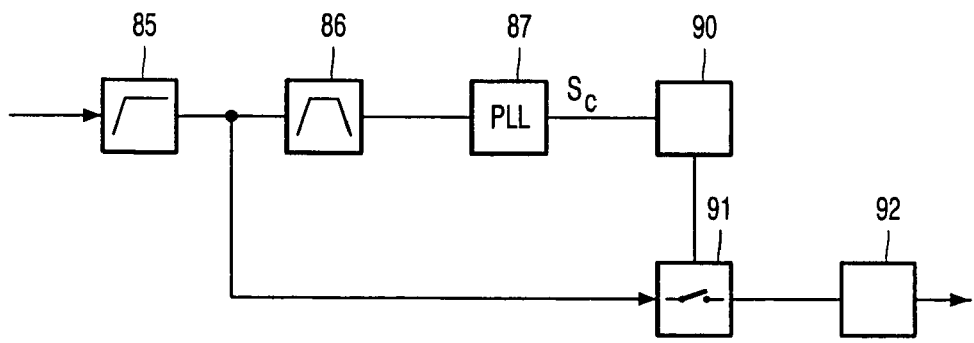

The objects, advantages and features of the invention will be apparent from the following more particular description of preferred embodiments of the invention, as illustrated in the accompanying drawings, in which FIGS. 1a and 1b show embodiments of a record carrier according to the invention, FIG. 2 shows an enlarged sections of three embodiments of a tracks on the record carrier, FIG. 3 shows four neighbouring tracks having undulating grooves, FIG. 4 shows three neighbouring tracks having undulating grooves, FIG. 5 shows a scanning device for the record carrier, FIGS. 6 and 7 show two embodiments of a signal processor for deriving position information from the grooves.

FIG. 1 shows an embodiment of a record carrier 1 according to the invention, FIG. 1a being a plan view and FIG. 1b showing a small part in a sectional view taken along the line b-b. The record carrier 1 comprises a series of tracks, each forming a 360° turn of a spiral line, of which some eight are shown in the Figure. A track is constituted, for example, by a preformed groove 4 or ridge 5 or a combination of a groove and a ridge. The tracks are intended for guiding a radiation beam along the tracks. For the purpose of recording information, the record carrier 1 comprises a recording layer 6, which is deposited on a transparent substrate 7 and which is covered by a protective coating 8. The tracks are scanned by a radiation beam entering the record carrier through substrate 7. The recording layer is made of a radiation-sensitive material which, if exposed to suitable radiation, changes its optical characteristics. Such a layer may be, for example, a thin layer of material such as tellurium, which changes reflection upon heating by a radiation beam. Alternatively, the layer may consist of magneto-optic or phase-change materials, which change direction of magnetization or crystalline structure, respectively, upon heating. Examples of phase change materials are compounds comprising tellurium such as AgInSbTe or GeSbTe. When the tracks are scanned by a radiation beam the intensity of which is modulated in conformity with the user information to be recorded, an information pattern of optically detectable marks is obtained, which pattern is representative of the information. In a non-recordable, read-only part of the record carrier the layer 6 may be a reflective layer, for example made from a metal such as aluminium or silver. The information in such a part is prerecorded in the record carrier during its manufacture, for example in the form of embossed pits.

The groove period in a radial direction of the record carrier shown is 0.74 μm, the widths of the land portion 5 and of the groove 4 may be equal, or the width of the groove portion may be equal to 0.4 times the track pitch. The depth of the groove is 50 nm. The record carrier is suitable for being scanned by a radiation beam having a wavelength between 635 and 650 nm.

FIG. 2 shows an enlarged plan view of three track portions 10-12 from three different embodiments of the record carrier according to the invention. A groove 13 of track portion 10 is indicated by a single undulating line for clarity. A land portion 14 in the Figure immediately below groove 13 pertains to that groove. The groove 13 and land portion 14 together form track portion 10. User information is written in the grooves by a radiation beam which is guided along the centre line of the groove. A track has substantially the same width along its length. The centre line of the track undulation wobbles in a direction 'y' transverse to the direction 'z' of the track. The wobble comprises a monotonous undulation 15 and local excursions 16 superposed on the undulation 15. The peak-peak amplitude 17 of the undulation is 30 nm. The period 18 of the undulation is 25 micrometer. The period can also be expressed as 186 T, where T is the channel bit length for recording user information in the groove, T having a length of 133 nm. The amplitude of excursion 16 is equal to 20 nm, i.e. smaller than the peak-peak amplitude of the undulation, and its width 20 is equal to 31 T. The processing of the read signals from the groove may be simplified, if the width of the excursion is an integer divisor of the period of the undulation.

Each track comprises equally spaced predetermined positions. The positions in FIG. 2 are at 270°±10° of the 360° period of the undulation. In an alternative embodiment of the record carrier the positions are at 90°±10°. Three such position are indicated in the Figure by dashed line 21-23. The predetermined positions along a track are divided in two types. The position of the first type, called an information position, is not intended for storing position information and is not marked in the Figure. The position of the second type, called an information position, is intended for storing position information.

The information positions are grouped in triplets. Information positions 21, 22 and 23 are an example of a triplet. The predetermined positions along a track are divided into consecutive bit cells of sixteen positions each. Each bit cell starts with a triplet of information positions followed by thirteen positions not intended for information storage.

An excursion 16 at an information position, having an amplitude pointing away from the land portion 14 may be represented by a "0", whereas the absence of an excursion at an information position may be represented by a "1". The wobble in track 10 represent the pattern "110". The bit cell with the pattern "100" represents a logical "0". The bit cell with the pattern "101" represents a logical "1". The cells with the patterns "111" and "110" represent synchronisation marks. Hence, each bit cell codes for a single bit or for a synchronisation mark. If ordinal numbers are assigned to the tracks on the record carrier, the pattern "111" may represent a synchronisation mark for even numbered tracks and the pattern "110" a synchronisation mark for odd numbered tracks. The two synchronisation marks may also be used to differentiate between two different positions of the triplet in a bit cell. In an alternative assignment, the patterns "100", "111", "110", "101" represent two synchronisation marks, a logical "1" and a logical "0", respectively.

The bit cells are grouped in sectors of sixty-four cells. The first cell of a sector contains a synchronisation mark. The sequence of sixty-three logical values in the subsequent bit cells represent the position information. The position information stored in the sectors may comprise address information, e.g. track number and sector number of the portion of the track being scanned, the layer number in a multilayer record carrier, directory information relating content of the record carrier to an address, and information useful for the writing process such as an identification of the type of the record carrier, e.g. write-once or rewritable, the purpose of the record carrier, e.g. general purpose or special, restricted purpose, physical information on the record carrier, e.g. track pitch, reference velocity, diameter of the record carrier, reflectivity, write conditions, an indication of the manufacturer and error-correction data.

Track 11 in FIG. 2 is an alternative embodiment of a track wobble. The track comprises a groove 25 and a land portion 26. The groove has the same undulation as groove 13. A bit cell has two consecutive information positions 27 and 28. The information is represented by two different excursions of the groove. A "1" is represented by an excursion 29 in the direction of the land portion 26, whereas a "0" is represented by an excursion 30 in a direction away from the land portion. The amplitudes of the excursions 29 and 30 are 10 and 30 nm, respectively. The peak-peak amplitude of excursion 30 is equal to the peak-peak amplitude of the undulation of groove 25. The doublet of information positions in track 11 represents the pattern "10". A bit cell with the pattern "10" or "01" represents a logical "0" or "1", respectively.

Track 12 in FIG. 2 is a third embodiment of a track wobble. The track comprises a groove 31 and a land portion 32. The groove has the same undulation as groove 13. A bit cell has three consecutive information positions 33, 34 and 35. The information is represented by two different excursions of the groove and by the presence of absence of a pit on land portion 32. The presence of a pit is indicated by a circle 37 on land portion 32, whereas the absence of a pit is indicated by a cross 39 on the land portion. Width 20 of an excursion is preferably 5 T or larger in order to make the width of the excursion equal to or larger than the width of the pit, thereby increasing the detection margin. A "1" is represented by an excursion 37 of the groove in the direction of the land portion 32 and a pit 37 in land portion 32 at the same information position 33. A "0" is represented by an excursion 38 of the groove in a direction away from the land portion and the absence of a pit 39 in land portion 32 at the same information position 34. The amplitudes of the excursions 36 and 38 are 30 and 40 nm, respectively. The groove and pit can have dimensions such that their depressions are not connected but are separated by an intervening land portion. In an alternative embodiment the amplitude of excursion 36 may be so large, that groove 31 and pit 37 form a single depressed area of the recording layer, which increases the detection signal obtained from the groove. The peak-peak amplitude of excursion 38 is larger than the peak-peak amplitude of the undulation of groove 31. The coding of the logical values over triplets of information positions is equal to that of track 10.

Although the information positions 18-20 in the embodiment shown in FIG. 2 are consecutive, they may be separated by one or more positions without information. To facilitate the detection of the pits at information positions, the wobble pertaining to the position immediately preceding an information position having a pit should have the phase of a wobble pertaining to an information position without a pit. Preferably, the wobbles pertaining to all positions without information should have the phase of a wobble pertaining to an information position without a pit.

FIG. 2 shows combinations of one groove and one land portion. There are several alternative ways to combine the groove-land combinations to a sequence of lands and grooves covering the recordable area of the record carrier. FIG. 3 shows a first way to combine grooves and lands of neighbouring tracks. Land portions 40, 42 and 44 pertain to groove 41, 43 and 45, respectively, forming three tracks 46, 47 and 48. Hence, each groove has one neighbouring land portion pertaining to itself and one neighbouring land portion pertaining to a neighbouring track. Although the width of the lands is of approximately the same size as the width of the grooves, the grooves are indicated by single line reason of clarity. When the radiation beam follows groove 41 of track 46, it should preferentially detect the pits on land 40 pertaining to groove 41. The position information is stored in the same way as in track 10 of FIG. 2, but the pertaining land portions are provided with pits. The separation between bit cells is indicated in the Figure by vertical dashed lines. The track between dashed lines 49 and 50 is one bit cell. The angular position of the start of a bit cell changes from one track to another track on a spiral track of a record carrier for operation in the CLV mode. FIG. 3 shows as an example a bit cell in track 48 that starts at dashed line 51 close to the start 49 of a bit cell in neighbouring track 47. If the information positions of the bit cell in track 48 were located immediately at the start of the bit cell, the accompanying pits on land 44 would strongly interfere with the reading of the position information of track 47. Therefore, the information positions 53 of the bit cell between dashed lines 51 and 52 are located in the middle of the bit cell. If a bit cell contains a synchronisation marks, that mark may be different for information positions at the start or in the middle of the bit cell; such different synchronisation marks are explained in the above paragraph relating to FIG. 2. When, further along the track or tracks, the start positions of the bit cells in neighbouring tracks are not anymore close together, the information positions will again be located at the start of the bit cells.

FIG. 4 shows a second way to combine grooves and lands of neighbouring tracks. A land portion 55 comprising pits pertains to the two neighbouring grooves 56 and 57. The land portion 58 between groove 57 and the neighbouring groove 59 does not contain pits. The undulation and the excursions in groove 56 are in anti-phase with the undulation and excursions in groove 57, thereby enhancing a read signal from the groove. The position information is common to the two grooves on both sides of the land portion. The scanning device can determine whether it scans a groove 56 or groove 57 from the phase of for instance the first period of the wobble in the cell.

In an alternative embodiment of a track, the groove comprises one or more so-called clock marks, i.e. a relatively fast modulation of the groove, at the start of a bit cell. A clock mark in an even-numbered track changes from a zero deviation to a minimum deviation, to a maximum deviation and back to a zero deviation. The deviation is the distance of the centre-line of the groove to the centre line of the land portion on which the information positions are located. A clock mark in an odd-numbered track changes from a zero deviation to a minimum deviation, to a maximum deviation and back to a zero deviation. The clock marks may be used for synchronisation purposes. The polarity of a clock mark may be used to determine whether the track being scanned is an even-numbered track or an odd-numbered track.

The invention is not limited to the wobble patterns of undulations and excursions shown in the Figures. The average value of the deviation of each wobble or of a series of wobbles is preferably equal to zero in order to avoid offsets in the radial tracking of the radiation beam. The wobbles may comprise sections with zero deviation in order to avoid sharp transitions in the deviation. Instead of the sinusoidal wobble, other forms of wobbles may be used, such as a triangular, square or a sinc-function wobble. The excursions may be half a period of a sinusoidal deviation of the groove position or a more rectangular shape. The width of the excursion is preferably substantially equal to the width of pits on the land portions. The wobbles need not be limited to a transverse deviation of the centre line of a track from its average position, but may also be a deviation of the groove width or depth from an average value or a deviation of one edge of the groove from an average value.

FIG. 5 shows an apparatus for scanning a record carrier as shown in FIG. 1. The apparatus comprises an optical system 71 for optically scanning tracks in record carrier 70. Optical system 71 comprises a radiation source 72, for example a semiconductor laser. Radiation source 72 emits a radiation beam 73, which is reflected by a beam splitter 34 and converged by an objective lens 75 to a radiation spot 76 on the tracks in an information layer of record carrier 70. Radiation reflected from the record carrier is guided through objective lens 75 and beam splitter 74 to a detector 77. The detector is a split-detector having a dividing line between the two halves of the detector running parallel to the direction of the tracks being scanned. The sum signal of the two halves, usually called the central aperture signal, represents the information recorded in the tracks and is output as signal $S_i$. The difference signal of the two halves, usually called the push-pull signal, represents position information and servo information recorded in the tracks, and is output as signal $S_p$. The low-frequency content of the signal $S_p$ represents the servo information, indicating the radial position of the radiation spot 76 with respect to the centre-line of the track being scanned. The signal $S_p$ is used as input for a servo circuit 78, possibly after a low-pass filter which passes the servo information but blocks the position information. The servo circuit controls the position of the radiation spot in a direction perpendicular to the direction of the track by controlling the position of optical system 71 and/or the position of objective lens 75 within the optical system.

The signal $S_p$ is also fed into a signal processor 79, which extracts the position information from the signal $S_p$. The position-information signal output from signal processor 79 is fed into a micro-processor 80. The micro-processor can derive, for example, the current position of radiation spot 76 on record carrier 70 from the position-information signal. During reading, erasing or writing, the micro-processor can compare the current position with a desired position and determine the parameters for a jump of the optical system to the desired position. The parameters for the jump are fed into servo circuit 78. The information signal $S_i$ is fed into the micro-processor, enabling it to derive for instance directory information from the signal, which may be used for controlling the position of the radiation spot. The information signal is provided as an output signal 81 of micro-processor 80.

When writing user information on a record carrier having prerecorded tracks comprising position information, the user information to be recorded is fed into micro-processor 80 by a signal 82. The scanning device reads the position information from the tracks. Micro-processor 80 synchronises the information to be written with the position information and generates a control signal which is connected to a source control unit 83. Source control unit 83 controls the optical power of the radiation beam emitted by radiation source 72, thereby controlling the formation of marks in record carrier 70. The synchronisation may involve the imposition of a fixed relation between the synchronisation patterns in the position information and synchronisation patterns present in the user information signal to be recorded.

The position information may be extracted from push-pull signal $S_p$ by filtering the push-pull signal at the frequency of the excursions or by sampling. FIG. 6 shows an embodiment of signal processor 79 where the position information is extracted by filtering. The push-pull signal $S_p$ is filtered by a high-pass filter 85 to remove disturbances having a frequency lower than 1 kHz. The output signal of filter 85 is subsequently filtered by a bandpass filter 86 having a centre frequency equal to the frequency of the undulation. A phase-locked loop 87 locks a digital clock signal $S_c$ to the filtered undulation signal. Phase changes in the wobble signal are relatively infrequent on the record carriers according to the invention. Hence, the width of the bandpass of filter 86 can be small, resulting in a stable clock signal. The output signal of filter 85 is high-pass filtered by a filter 88, which passes only frequency components pertaining to the excursions, i.e. above the frequency of the undulations of the groove. The output signal of filter 88 is connected to a processing circuit 89, which performs a threshold detection and converts the result to logical values representing the position information stored in the excursions.

FIG. 7 shows an embodiment of signal processor 79 where the position information is derived by synchronous detection and sampling of the push-pull signal. The clock signal $S_c$ is obtained in the same way as shown in FIG. 6. Clock signal $S_c$ is processed by converter 90, which converts the clock signal into a sample signal having a pulse either at each predetermined position or only at each information position. The sample signal controls a sampler 91, which takes samples of the output signal of filter 85. The samples are processed in a circuit 92, comprising a threshold detector and a convertor, which converts the pattern obtained by the threshold detector into logical values representing the position information.

The invention claimed is:

1. An apparatus for scanning an optical record carrier having substantially parallel tracks for recording user information in a pattern of optically detectable marks, the tracks being provided with grooves having a series of substantially monotonous undulations formed therein in which position information is stored within excursions contained within the undulations, the apparatus comprising:
   an optical system for scanning tracks by a radiation beam,
   a detector for detecting a radiation beam coming from the record carrier, and
   a signal processor for deriving position information from an output signal of the detector, wherein the signal processor is provided with a high pass filter for filtering the output signal and providing a filtered signal, a first filter for passing first signal components of the filtered signal at a first frequency and forming a clock signal therefrom, and a second filter for passing second signal components of the filtered signal at a second, higher, frequency than the first frequency and forming a signal representing the position information contained in the excursions contained within the undulations.

2. The apparatus of claim 1 wherein the first filter further comprises a bandpass filter.

3. The apparatus of claim 2 wherein the bandpass filter has a center frequency of equal frequency to the series of undulations formed within the grooves to the tracks.

4. The apparatus of claim 2, further comprising a phase lock loop that forms the clock signal with a frequency locked that of the series of undulations.

5. The apparatus of claim 2, wherein the bandpass filter has a reduced width in order to further stabilize the clock signal.

6. The apparatus of claim 1, wherein the first frequency is related to a frequency of the monotonous undulations.

7. The apparatus of claim 6, wherein the second frequency is related to a frequency of the excursions.

8. The apparatus of claim 7, wherein an amplitude of the excursions is smaller than an amplitude of the undulations.

9. A method of scanning an optical record carrier having substantially parallel tracks for recording user information in a pattern of optically detectable marks, the tracks being provided with grooves having a series of substantially monotonous undulations formed therein in which position information is stored within excursions contained within the undulations, the method comprising the acts of:
   converting radiation from the record carrier into an electric signal representing track deviations;
   filtering the signal by a first high pass filter to pass a filtered signal;
   filtering the filtered signal for passing first signal components at a first frequency;
   converting the first signal components to a clock signal;
   filtering the filtered signal for passing second signal components at a second frequency which is higher than the first frequency; and
   converting the second signal components to a position signal representing the position information.

10. The method of claim 9, wherein the act of filtering the filtered signal for passing the first signal components is performed using a bandpass filter.

11. The method of claim 10, wherein the bandpass filter has a center frequency which is equal to a frequency of the monotonous undulations.

12. The method of claim 11, further comprising the act of locking a frequency of the clock signal to the frequency of the monotonous undulations.

13. The method of claim 10, the act of stabilizing the clock signal by reducing a width of the bandpass filter.

14. The method of claim 9, wherein the first frequency is related to a frequency of the monotonous undulations.

15. The method of claim 14, wherein the second frequency is related to a frequency of the excursions.

16. The method of claim 15, wherein an amplitude of the excursions is smaller than an amplitude of the undulations.

17. A device of scanning an optical record carrier having substantially parallel tracks for recording user information in a pattern of optically detectable marks, the tracks being provided with grooves having a series of substantially monotonous undulations formed therein in which position information is stored within excursions contained within the undulations, the device comprising:
   a processor for converting radiation from the record carrier into an electric signal representing track deviations;
   a first high pass filter for filtering the signal to pass a filtered signal;
   a band pass filter for filtering the filtered signal for passing first signal components at a first frequency for conversion of the first signal components to a clock signal; and
   a second high pass filter for filtering the filtered signal for passing second signal components at a second frequency which is higher than the first frequency for conversion of the second signal components to a position signal representing the position information.

18. The device of claim 17, wherein a width of at least one of the excursions is an integer divisor of a period of the substantially monotonous undulations.

* * * * *